(12) United States Patent
Kawamura et al.

(10) Patent No.: US 10,440,171 B2
(45) Date of Patent: Oct. 8, 2019

(54) COMMUNICATION TERMINAL APPARATUS AND PROGRAM

(71) Applicant: NTT DOCOMO, INC., Tokyo (JP)

(72) Inventors: Satoru Kawamura, Tokyo (JP);
Nobuto Arai, Tokyo (JP); Tsuneyo Yamauchi, Tokyo (JP); Shunsaku Yamazaki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/062,988

(22) PCT Filed: Jan. 17, 2017

(86) PCT No.: PCT/JP2017/001311
§ 371 (c)(1),
(2) Date: Jun. 15, 2018

(87) PCT Pub. No.: WO2017/126485
PCT Pub. Date: Jul. 27, 2017

(65) Prior Publication Data
US 2018/0367662 A1    Dec. 20, 2018

(30) Foreign Application Priority Data

Jan. 20, 2016 (JP) ................................. 2016-008694

(51) Int. Cl.
*H04M 3/42* (2006.01)
*H04M 1/00* (2006.01)
(Continued)

(52) U.S. Cl.
CPC ...... *H04M 1/72563* (2013.01); *G06F 1/1694* (2013.01); *G06F 3/017* (2013.01);
(Continued)

(58) Field of Classification Search
CPC .... H04M 1/72563; H04M 1/00; H04M 19/04; H04M 1/0241; G06F 3/017
(Continued)

(56) References Cited

U.S. PATENT DOCUMENTS 6,230,028 B1 * 5/2001 Shirakawa .......... H04M 1/0214
455/566
2004/0203520 A1 * 10/2004 Schirtzinger ........... G06F 1/162
455/90.3
(Continued)

FOREIGN PATENT DOCUMENTS

CN    105072280 A    11/2015
JP    61-258550 A    11/1986
(Continued)

OTHER PUBLICATIONS

International Search Report issued in corresponding International Application No. PCT/JP2017/001311 dated Apr. 4, 2017, 4 pages.
(Continued)

*Primary Examiner* — Rafael Pérez-Gutiérrez
*Assistant Examiner* — Mark G. Pannell
(74) *Attorney, Agent, or Firm* — MKG, LLC

(57) ABSTRACT

Portable communication terminal apparatus includes a function of performing communication for a call. Also, communication terminal apparatus includes a proximity sensor for detecting that an object (head of a user) exists in proximity to the communication terminal apparatus, and an acceleration sensor for measuring a motion state of the communication terminal apparatus. Communication terminal apparatus performs call ending processing for ending a call if, during the call, a transition is made from a state in which the presence of the object is detected by the proximity sensor to a state in which the presence of the object is not detected, and thereafter the motion state detected by the acceleration (Continued)

sensor satisfies a predetermined condition. The condition of the motion state is determined, for example, based on an operation consciously performed by the user, such as an operation of shaking communication terminal apparatus.

3 Claims, 8 Drawing Sheets

(51) Int. Cl.
G06F 3/033 (2013.01)
H04M 1/725 (2006.01)
G06F 3/01 (2006.01)
G06F 1/16 (2006.01)

(52) U.S. Cl.
CPC . H04M 1/72569 (2013.01); G06F 2200/1637 (2013.01); H04M 2250/12 (2013.01)

(58) Field of Classification Search
USPC ...................................................... 455/414.1
See application file for complete search history.

(56) References Cited

U.S. PATENT DOCUMENTS

| | | | | |
|---|---|---|---|---|
| 2005/0232404 A1* | 10/2005 | Gaskill | ............. | H04M 1/72569 379/201.06 |
| 2006/0242434 A1 | 10/2006 | Lee | | |
| 2009/0167032 A1* | 7/2009 | Grossman | ................ | F03G 5/06 290/1 R |
| 2009/0197615 A1* | 8/2009 | Kim | ...................... | H04M 1/605 455/456.1 |
| 2011/0319128 A1* | 12/2011 | Miwa | .................. | H04M 1/6008 455/550.1 |
| 2013/0100017 A1* | 4/2013 | Papakipos | ........... | H04L 12/1845 345/158 |
| 2014/0148193 A1* | 5/2014 | Kogan | .................. | H04W 76/30 455/456.1 |
| 2014/0233356 A1* | 8/2014 | Pattikonda | ........... | G04G 9/0064 368/13 |
| 2015/0038124 A1* | 2/2015 | Park | ..................... | H04W 64/006 455/414.1 |
| 2015/0109194 A1* | 4/2015 | Tamaoki | ............... | G06F 1/1694 345/156 |
| 2015/0312393 A1* | 10/2015 | Chen | ................. | H04M 1/72519 455/550.1 |

FOREIGN PATENT DOCUMENTS

| | | |
|---|---|---|
| JP | 07-007536 A | 1/1995 |
| JP | 2006-211690 A | 8/2006 |
| JP | 2015-532559 A | 11/2015 |
| JP | 2006-245919 A | 9/2016 |
| JP | 2007-189588 A | 7/2017 |

OTHER PUBLICATIONS

Notice of Reasons for Refusal issued in corresponding Japanese Patent Application No. 2017-562815, dated Jun. 25, 2019, 5 Pages.
Extended European Search Report issued in corresponding European Application No. 17741363.0 dated Jun. 12, 2019, 8 pages.

* cited by examiner

COMMUNICATION TERMINAL APPARATUS AND PROGRAM

TECHNICAL FIELD

The present invention relates to control performed when ending a call.

JP 61-258550A and JP 07-007536A disclose techniques for putting a call on hold with no hold operation performed by a user. JP 61-25850A discloses that a sensor that detects presence is provided on a surface of a handset that opposes a mouth or ear of an operator, and a call state is automatically put on hold when the presence of a detection target object is continuously not detected for a predetermined amount of time. JP 07-007536A discloses that the hold function is automatically set when the headset is tilted by a predetermined angle or more (when the handset is placed on a desk at a predetermined angle).

In the technique disclosed in JP 61-258550A, if the user consciously or unconsciously temporarily stops the action of holding the handset against the user's ear, the call will be put on hold, regardless of whether or not the user intends to continue the call. In the technique disclosed in JP 07-007536A, the call is interrupted depending on how much the handset is tilted, even if the user is holding the handset against the ear. Thus, with the techniques disclosed in JP 61-258550A and JP 07-007536A, there is a possibility that the call will be interrupted even if the user intends to continue the call.

In contrast to this, an object of the present invention is to provide a technique for ending a call at a timing intended by the user, even if the user does not perform an operation of an operation element for ending the call.

SUMMARY OF THE INVENTION

In order to resolve the above-described problem, the communication terminal apparatus of the present invention includes: a proximity detection unit configured to detect that an object exists in proximity to the portable communication terminal apparatus; a motion state measurement unit configured to measure a motion state of the communication terminal apparatus; and a call ending control unit configured to end a call when, during the call, a transition is made from a first state, in which a presence of the object is detected, to a second state in which the presence of the object is not detected, and thereafter the measured motion state satisfies a predetermined condition.

With the communication terminal apparatus of the present invention, the condition may indicate a predetermined motion state.

With the communication terminal apparatus of the present invention, the motion state measurement unit may measure an orientation of the communication terminal apparatus as the motion state, and the call ending control unit may either end the call or allow the call to continue based on a difference between the orientation measured during the first state and the orientation measured after the transition is made to the second state.

With this communication terminal apparatus, the call ending control unit may either end the call or allow the call to continue based on a difference between the orientation measured during the first state and the orientation measured during a third state in which subsequent to the presence of the object no longer being detected, the presence of the object is once again detected.

Furthermore, a similarity degree calculation unit configured to calculate a degree of similarity between the orientation measured during the first state and the orientation measured during the third state may be included. The call ending control unit may end the call when the calculated degree of similarity is less than a threshold.

Also, a communication terminal apparatus including a handset of the present invention includes: a proximity detection unit configured to detect that an object exists in proximity to the handset; a motion state measurement unit configured to measure a motion state of the handset; and a call ending control unit configured to end a call when, during the call, a transition is made from a first state, in which presence of the object is detected, to a second state in which the presence of the object is not detected, and thereafter the measured motion state satisfies a predetermined condition.

Also, a program of the present invention is a program for causing a computer of a portable communication terminal apparatus to execute: a step of detecting that an object exists in proximity to the communication terminal apparatus; a step of measuring a motion state of the communication terminal apparatus; and a step of ending a call when, during the call, a transition is made from a first state, in which a presence of the object is detected, to a second state in which the presence of the object is not detected, and thereafter the measured motion state satisfies a predetermined condition.

According to the present invention, it is possible to provide a technique for ending a call at a timing intended by the user, even if the user does not perform an operation of an operation element for ending the call.

DETAILED DESCRIPTION

Hereinafter, embodiments of the present invention will be described with reference to the drawings.

First Embodiment

Figure 1:
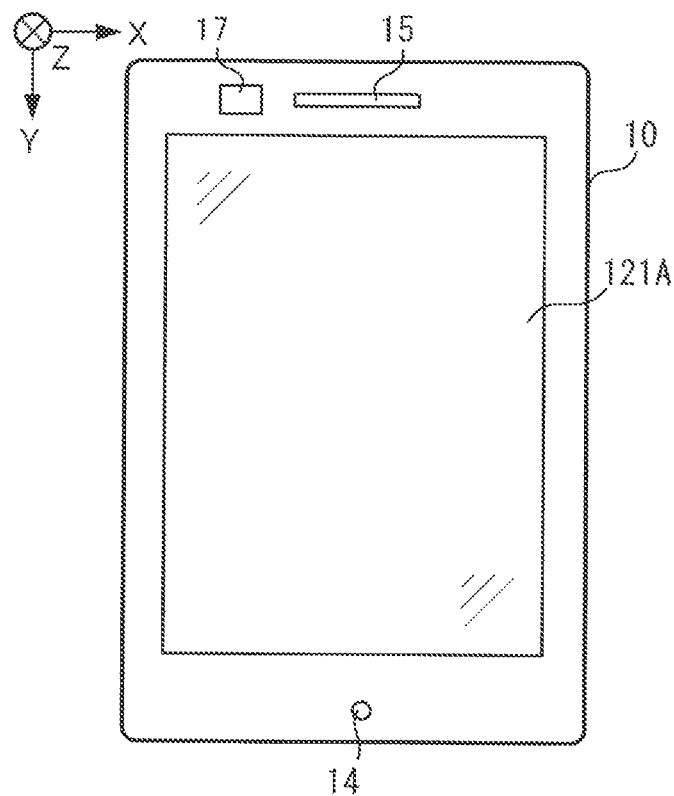
FIG. 1 is a front view of a communication terminal apparatus according to a first embodiment of the present invention.

FIG. 1 is a front view of communication terminal apparatus 10 according to a first embodiment of the present invention. Communication terminal apparatus 10 is a portable communication terminal apparatus that is used by a user while being held in the user's hand. Communication terminal apparatus 10 is a smartphone in the present embodiment.

Communication terminal apparatus 10 has the same appearance as a general-use smartphone and is formed into an approximately cuboid shape.

Communication terminal apparatus 10 performs transmission and reception of audio for making a call. Communication terminal apparatus 10 includes microphone 14 and speaker 15 on its front surface side. Microphone 14 is an apparatus for inputting audio to be transmitted. Microphone 14 is disposed so as to be located near the mouth of a user making a call. Speaker 15 is an apparatus for outputting audio that is received. Speaker 15 is disposed so as to be located near the head (or more specifically, the ear) of a user making a call.

Communication terminal apparatus 10 further includes display region 121A and proximity sensor 17 on its front surface side. Display region 121A is a rectangular region of later-described display unit 121, on which an image (screen) is displayed. Proximity sensor 17 is provided adjacent to speaker 15 and is a sensor for detecting the presence of the head of the user making a call.

For the sake of convenience in the description, hereinafter, an XYZ orthogonal coordinate system composed of an X axis, a Y axis, and a Z axis will be used in some cases. The X axis is an axis that extends in a width direction of communication terminal apparatus 10, and is parallel to the short edge of display region 121A in the present embodiment. The Y axis is an axis that extends in a height direction of communication terminal apparatus 10, and is parallel to the long edge of display region 121A in the present embodiment. The Z axis is an axis that extends in a thickness direction of communication terminal apparatus 10, and more specifically, is orthogonal to display region 121A.

Figure 2:
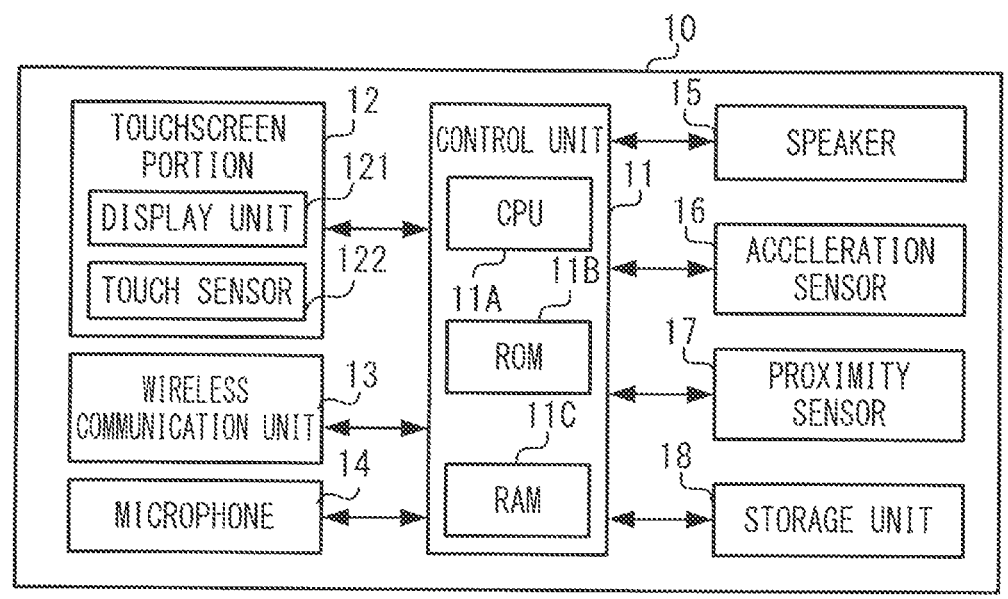
FIG. 2 is a block diagram showing a hardware configuration of the communication terminal apparatus according to the first embodiment.

FIG. 2 is a block diagram showing a hardware configuration of communication terminal apparatus 10. As shown in FIG. 2, communication terminal apparatus 10 includes control unit 11, touchscreen portion 12, wireless communication unit 13, microphone 14, speaker 15, acceleration sensor 16, proximity sensor 17, and storage unit 18.

Control unit 11 is a processor including CPU (Central Processing Unit) 11A serving as a calculation processing apparatus, ROM (Read Only Memory) 11B, and RAM (Random Access Memory) 11C serving as a work area. CPU 11A controls the units of communication terminal apparatus 10 by reading out a program stored in ROM 11B or storage unit 18 to RAM 11C and executing it.

Touchscreen portion 12 includes display unit 121 and touch sensor 122. Display unit 121 displays an image in display region 121A (see FIG. 1) with a liquid crystal display, for example. Touch sensor 122 uses a planar sensor provided overlaid on display region 121A to detect an operation of the user performed on display region 121A, in accordance with a predetermined method (e.g., a resistive film method or a capacitive sensing method).

Wireless communication unit 13 includes a wireless communication circuit and an antenna, and functions as a communication unit that performs wireless communication. Wireless communication unit 13 is connected to a telephone circuit (not shown) and at least performs communication for a call (audio call).

Microphone 14 converts audio input by the user into an audio signal. Speaker 15 converts a supplied audio signal into audio and outputs the audio.

Acceleration sensor 16 is a triaxial acceleration sensor and is a sensor that measures acceleration applied to communication terminal apparatus 10. In the present embodiment, acceleration sensor 16 measures acceleration applied to the X axis, the Y axis, and the Z axis. Acceleration sensor 16 is used to measure a motion state of communication terminal apparatus 10. The motion state of communication terminal apparatus 10 indicates all states of motion of communication terminal apparatus 10, but in the present embodiment, it is a state specified according to the orientation or displacement (movement) of communication terminal apparatus 10, or a combination thereof. The orientation of communication terminal apparatus 10 is specified according to an inclination (e.g., angle of rotation) from a reference direction of communication terminal apparatus 10. Displacement of communication terminal apparatus 10 is specified according to the path on which communication terminal apparatus 10 moves, for example. This path is determined according to a combination of the distance over which communication terminal apparatus 10 moves and the direction of the movement, for example. The motion state of communication terminal apparatus 10 changes due to an external force being applied to communication terminal apparatus 10 or its housing, but in general, the motion state does not change due to an operation of an operation element (e.g., an operation of touchscreen portion 12) realized by hardware or software.

Proximity sensor 17 is a sensor for detecting the presence of an object. Proximity sensor 17 is an induction-type or electrostatic capacity-type proximity sensor, and detects whether or not an object is within a predetermined distance. Proximity sensor 17 can detect the presence of an object, or more specifically, a state in which the object is not in contact and a state in which the object is in contact.

Storage unit 18 includes an EEPROM (Electronically Erasable and Programmable ROM) or a flash memory, for example, and stores various types of data. Storage unit 18 stores an OS (Operating System) installed on communication terminal apparatus 10, and various types of programs that operate on the OS. An example of this program is a program (application program) that realizes a function of ending a call even if a call ending operation is not performed by the user. "Call ending operation" refers to an operation that is performed by a user to instruct the end of a call.

Figure 3:
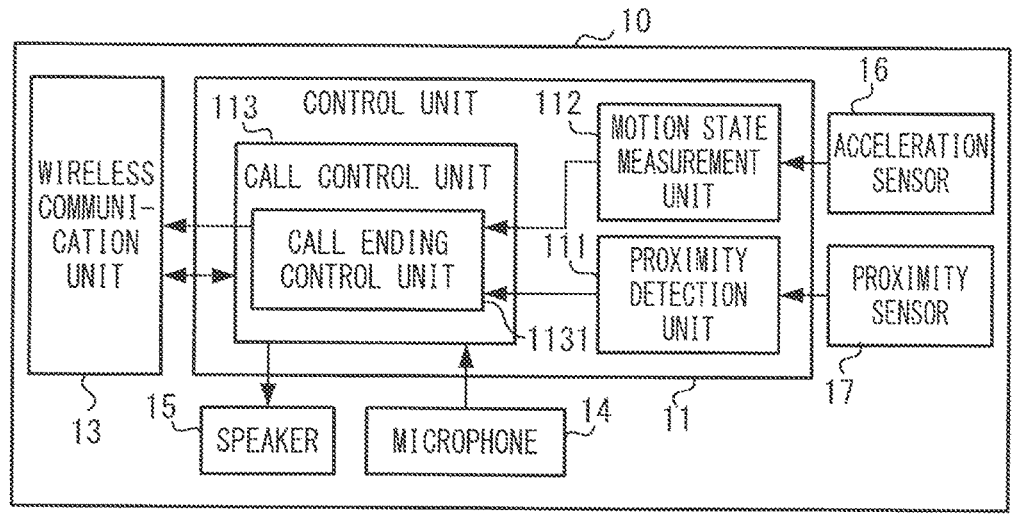
FIG. 3 is a block diagram showing a functional configuration of a control unit according to the first embodiment.

FIG. 3 is a block diagram showing a functional configuration of control unit 11. By executing a program, control unit 11 realizes functions corresponding to proximity detection unit 111, motion state measurement unit 112, and call control unit 113.

Proximity detection unit 111 detects that an object exists in proximity to communication terminal apparatus 10 based on the detection result of proximity sensor 17. In the present embodiment, if proximity detection unit 111 detects the presence of an object during a call, the object is regarded as the head of the user. "During a call" refers to a period during which a communication path used for a call is established.

Motion state measurement unit 112 measures the motion state of communication terminal apparatus 10 based on the acceleration measured by acceleration sensor 16. In the present embodiment, motion state measurement unit 112 measures the orientation and/or displacement of communication terminal apparatus 10.

Call control unit 113 performs control relating to a call, such as making an outgoing call, responding to an incoming call, and establishment of a communication path. Call control unit 113 includes call ending control unit 1131. If, during a call, a transition is made from a first state in which the presence of an object is detected by proximity detection unit 111 to a second state in which the presence of the object is not detected, and thereafter the motion state of communication terminal apparatus 10 measured by motion state measurement unit 112 satisfies a predetermined condition, call ending control unit 1131 ends the call. Control for ending a call will hereinafter be referred to as "call ending control". In call ending control, wireless communication unit 13 is controlled such that the communication path established for the call is disconnected. The call ending control may be the same as control that is performed when a call ending operation is performed with a common telephone. Here, the condition of the motion state is fixed to a predetermined motion state. If the call is not to be ended, call ending control unit 113 allows the call to continue. If the call is not to be ended, the call inevitably continues. Accordingly, there is no need for call ending control unit 1131 to perform separate control for allowing the call to continue.

Figure 4:
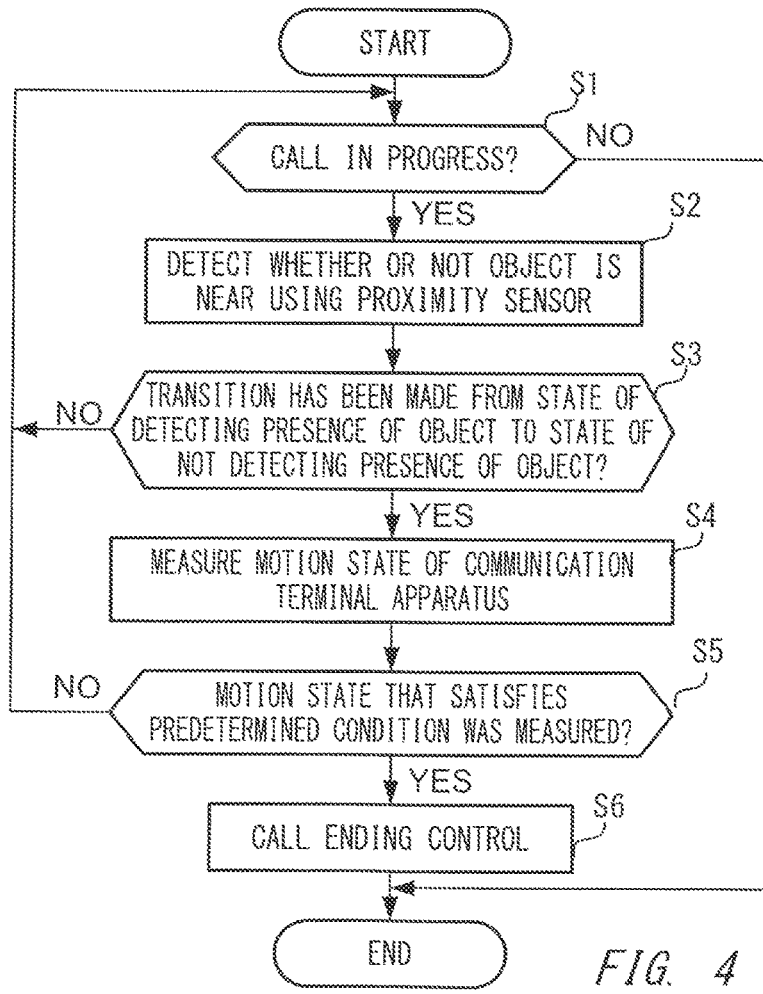
FIG. 4 is a flowchart showing processing executed during a call by the communication terminal apparatus according to the first embodiment.
Figure 5:
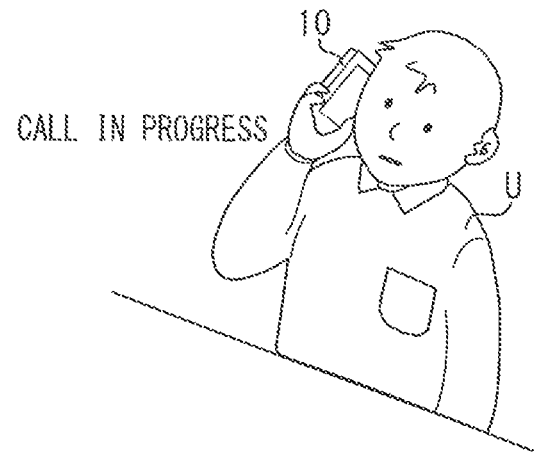
FIG. 5 is an explanatory diagram showing an example of a state of the communication terminal apparatus and a user.
Figure 5:
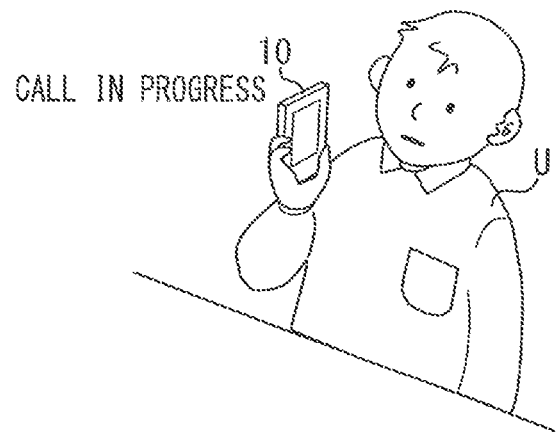
Figure 5:
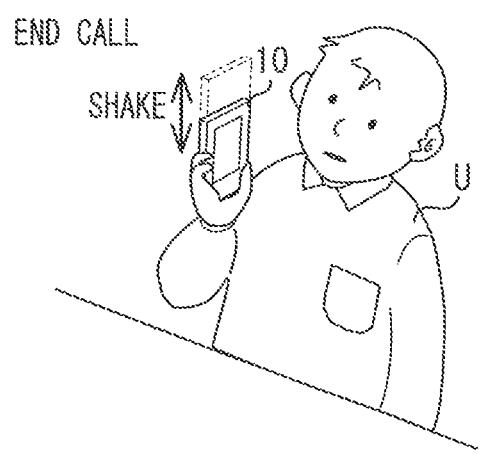

FIG. 4 is a flowchart showing processing executed by communication terminal apparatus 10 during a call. FIG. 5 is a diagram describing an example of a state of communication terminal apparatus 10 and a user.

Control unit 11 determines whether or not a call is in progress (step S1). Control unit 11 determines "YES" in step S1 in a period during which a communication path for a call is established via wireless communication unit 13. In this case, control unit 11 next detects whether or not an object is near using proximity sensor 17 (step S2).

Next, control unit 11 determines whether or not a transition has been made from a state (first state) in which the presence of the object is detected by proximity sensor 17 to a state (second state) in which the presence of the object is not detected (step S3). As shown in the top portion of FIG. 5, during a call made by user U using communication terminal apparatus 10, user U holds communication terminal apparatus 10 near his or her head (here, the right ear). In this case, control unit 11 determines that the presence of the object has been detected by proximity sensor 17 (step S3: NO), allows the call to continue, and returns to the processing of step S1.

Here, as shown in the middle portion of FIG. 5, it is assumed that user U has performed an operation of moving communication terminal apparatus 10 away from his or her head. In this case, control unit 11 determines that the presence of the object is no longer detected by proximity sensor 17 (step S3: YES), and advances to the processing of step S4.

If user U has performed the movement shown in the middle portion of FIG. 5, there is both a possibility that user U is trying to end the call and a possibility that user U intends to continue the call but has merely temporarily moved communication terminal apparatus 10 away.

Next, control unit 11 measures the motion state of communication terminal apparatus 10 based on the acceleration measured by acceleration sensor 16 (step S4). Then, control unit 11 determines whether or not a motion state that satisfies the predetermined condition has been measured (step S5). In the present embodiment, the condition of the motion state is, in the present embodiment, determined according to an operation performed consciously by the user on communication terminal apparatus 10. Specifically, the condition of the motion state is determined as an operation of shaking communication terminal apparatus 10 performed by the user (i.e., one or more reciprocal movements).

Here, as shown in the bottom portion of FIG. 5, it is assumed that user U has performed an operation of shaking communication terminal apparatus 10 in a state in which communication terminal apparatus 10 has been moved away from his or her head. In this case, control unit 11 determines "YES" in step S5. Then, control unit 11 performs call ending control for ending the call (step S6).

Note that in the bottom portion of FIG. 5, a case is indicated in which communication terminal apparatus 10 is shaken up and down, but control unit 11 may perform call ending control regardless of the direction of shaking.

If "NO" is determined in step S5, control unit 11 allows the call to continue and returns to the processing of step S1. That is, control unit 11 allows the call to continue even if a transition has been made from a state in which the presence of the object is detected by proximity sensor 17 to a state in which the presence of the object is not detected.

For example, control unit 11 allows the call to continue also in the case where a transition is made from the state shown in the middle portion of FIG. 5 to the state shown in the top portion of FIG. 5 and the presence of the object is once again detected. Also, if user U performs an operation of shaking communication terminal apparatus 10 in a state in which communication terminal apparatus 10 is near the head, control unit 11 makes a determination of "NO" in step S3 and therefore allows the call to continue.

If it is determined in step S1 that a call is not in progress (step S1: NO), control unit 11 ends the processing of FIG. 4. For example, if a call ending operation performed by the user has been received, control unit 11 ends the call according to the call ending operation and thus ends the processing of FIG. 4.

If communication terminal apparatus 10 of the above-described first embodiment measures an operation of moving communication terminal apparatus 10 away from the head, which is naturally performed when the user ends a call, and thereafter measures a predetermined movement performed consciously by the user, communication terminal apparatus 10 performs call ending control. In this manner, the operation performed consciously by the user and the timing of the operation are reflected in the conditions for executing the call ending control. Accordingly, with communication terminal apparatus 10, it is possible to reduce the likelihood that a call will be ended at a timing not intended by the user.

Furthermore, the user need not instruct the end of the call by performing an operation of an operation element (e.g., an operation of touchscreen portion 12), and therefore even if the user is not accustomed to operating touchscreen portion 12, the burden that the user feels regarding the operation for ending the call will be small.

Second Embodiment

Communication terminal apparatus 10 of the present embodiment differs from that of the above-described first embodiment in that the motion state of communication terminal apparatus 10 that is a condition for ending the call varies according to the motion state of communication terminal apparatus 10 during the call. In the present embodiment, elements denoted by the same reference signs as in the above-described first embodiment have the same functions as in the above-described first embodiment. The hardware configuration of communication terminal apparatus 10 of the present embodiment is the same as in the above-described first embodiment, and therefore description thereof is omitted.

Figure 6:
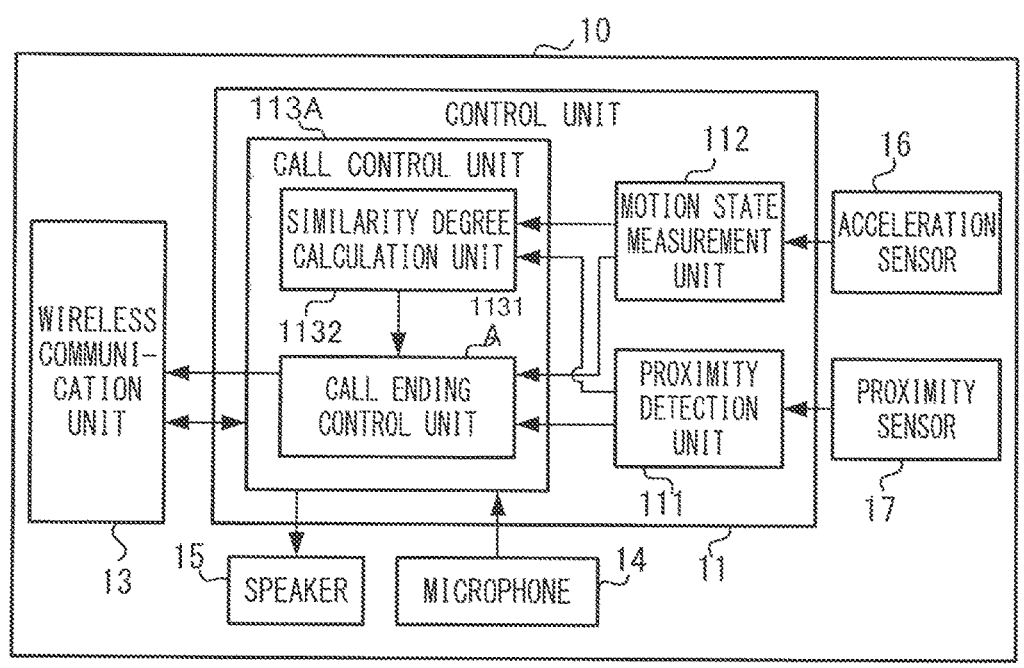
FIG. 6 is a block diagram showing a functional configuration of a control unit according to a second embodiment of the present invention.

FIG. 6 is a block diagram showing a functional configuration of control unit 11 of the present embodiment. By executing a program, control unit 11 realizes functions corresponding to proximity detection unit 111, motion state measurement unit 112, and call control unit 113A.

Similarly to the above-described first embodiment, proximity detection unit 111 detects that an object exists in proximity to communication terminal apparatus 10 based on the detection result of proximity sensor 17. Similarly to the above-described first embodiment, motion state measurement unit 112 measures the motion state of communication terminal apparatus 10 based on the acceleration measured by acceleration sensor 16.

Call control unit 113A includes similarity degree calculation unit 1132 and call ending control unit 1131A. Similarity degree calculation unit 1132 calculates the degree of similarity between an orientation of communication terminal apparatus 10 measured when in a first state in which the presence of the object is detected by proximity sensor 17 and an orientation of communication terminal apparatus 10 measured after a transition is made to a second state in which the presence of the object is not detected. For example, similarity degree calculation unit 1132 of the present embodiment measures the degree of similarity between an orientation measured when in the first state and an orientation measured when in a third state in which subsequent to the presence of the object no longer being detected by proximity detection unit 111, the presence of the object is once again detected.

Call ending control unit 1131A ends the call or allows the call to continue based on the difference between the orientation of communication terminal apparatus 10 measured when the presence of the object is being detected by proximity sensor 17 and the orientation of communication terminal apparatus 10 measured after the presence of the object stops being detected. In particular, call ending control unit 1131A of the present embodiment ends the call if the degree of similarity between the orientation measured when in the above-described first state and the orientation measured when in the above-described third state is less than a threshold value, and call ending control unit 1131A allows the call to continue if the degree of similarity is greater than or equal to a threshold value.

Figure 7:
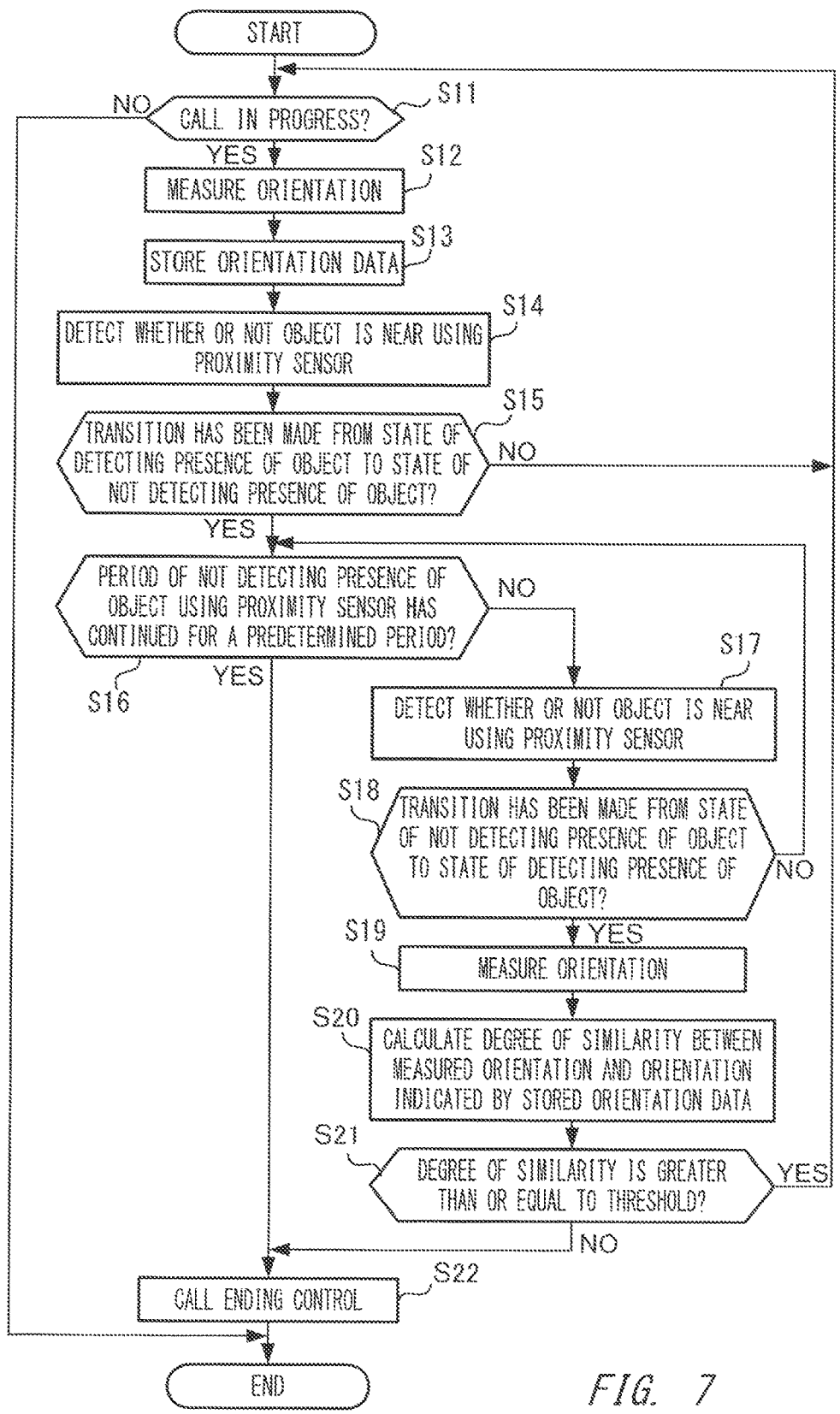
FIG. 7 is a flowchart showing processing executed during a call by the communication terminal apparatus according to the second embodiment.
Figure 8:
FIG. 8 is an explanatory diagram showing an example of a state of the communication terminal apparatus and a user.

FIG. 7 is a flowchart showing processing executed by communication terminal apparatus 10 during a call. FIG. 8 is a diagram describing an example of a state of communication terminal apparatus 10 and a user.

Control unit 11 determines whether or not a call is in progress (step S11). If the result of the determination is "YES" in step S11, control unit 11 measures the orientation of communication terminal apparatus 10 based on the acceleration measured by acceleration sensor 16 (step S12). Control unit 11 stores the orientation data showing the measured orientation in storage unit 18 (step S13). The orientation data is data indicating the measured triaxial acceleration, for example.

Next, control unit 11 detects whether or not an object is near using proximity sensor 17 (step S14). Next, control unit 11 determines whether or not a transition has been made from a state (first state) in which the presence of the object is detected by proximity sensor 17 to a state (second state) in which the presence of the object is not detected (step S15). As shown in the upper portion of FIG. 8, if a call is in progress due to user U using communication terminal apparatus 10, user U holds communication terminal apparatus 10 near his or her head (here, the right ear). In this case, control unit 11 determines that the presence of the object is being detected (step S15: NO), allows the call to continue, and returns to the processing of step S11. Then, control unit 11 executes the processing steps of steps S12 to S15 once again. In other words, during a call, the orientation measured in step S12 is the orientation of communication terminal apparatus 10 in a period during which the presence of the object is being detected by proximity sensor 17.

Note that in step S13, control unit 11 may store the orientation data such that the orientation data accumulates in storage unit 18, or control unit 11 may store only the orientation data of the most recent measurement date or only the orientation data of the measurement dates included in a predetermined period before the current time.

Here, as shown in the middle portion of FIG. 8, it is assumed that user U has performed an operation of moving communication terminal apparatus 10 away from his or her head. In this case, control unit 11 determines that the presence of the object has stopped being detected by proximity sensor 17 (step S15: YES), and advances to the processing of step S16. Next, control unit 11 detects whether or not the period during which the presence of the object is not detected by proximity sensor 17 has continued for a predetermined period (step S16). The length of the predetermined period is a fixed value or a variable value. Also, in the case where the presence of the object is not detected by proximity sensor 17, if it is determined that the period during which the presence of the object is not detected has not continued for the predetermined period (step S16: NO), control unit 11 advances to the processing of step S17. Next, control unit 11 detects whether or not an object is near using proximity sensor 17 (step S17). Next, control unit 11 determines whether or not a transition has been made from a state (second state) in which the presence of the object is not detected by proximity sensor 17 to a state (third state) in which the presence of the object is once again detected (step S18). If it is determined that the presence of the object is not being detected by proximity sensor 17 (step S18: NO), control unit 11 returns to the processing of step S16. Then, if it is determined that the period during which the presence of the object is not detected by proximity sensor 17 has continued for a predetermined period (step S16: YES), control unit 11 performs call ending control for ending the call (step S22). If the presence of the object is not detected by proximity sensor 17 continuously for a certain period, it is assumed that the user does not intend to make a call using communication terminal apparatus 10. For this reason, control unit 11 performs call ending control even if there is no operation for instructing the end of the call by the user.

On the other hand, in step S18, if it is detected that a transition has been made from a state (second state) in which the presence of the object is not detected by proximity sensor 17 to a state (third state) in which the presence of the object is once again detected (step S18: YES), control unit 11 advances to the processing of step S19. Next, control unit 11 measures the orientation of communication terminal apparatus 10 based on the acceleration measured by acceleration sensor 16 (step S19). In other words, during a call, the orientation measured in step S19 is the orientation of communication terminal apparatus 10 when the presence of the object is once again being detected by proximity sensor 17 after the presence of the object stopped being detected.

[Next, control unit 11 calculates the degree of similarity between the orientation measured in step S19 and the orientation indicated by the orientation data stored in storage unit 18 (i.e., the orientation indicated by the orientation data stored in step S13) (step S20). The orientation data used to calculate the degree of similarity is, for example, the orientation data from the most recent measurement date, but the orientation data used to calculate the degree of similarity may be from any measurement date, as long as it is data that indicates the orientation of communication terminal apparatus 10 when in the first state during a call.

Examples of algorithms for calculating the degree of similarity include Angular Metrics for Shape Similarity (AMSS) and Dynamic Time Warping (DTW), but various types of similarity degree calculation algorithms can be employed. However, in the present embodiment, control unit 11 calculates the degree of similarity using a method in which the orientation when the user holds communication terminal apparatus 10 up to his or her right ear and the orientation when the user holds communication terminal apparatus 10 up to the user's left ear are regarded as being the same or approximately the same. For example, with regard to the X axis and the Z axis, control unit 11 may perform calculation of the degree of similarity ignoring the sign (+ or −) that indicates the direction in which the acceleration is applied.

Next, control unit 11 determines whether or not the degree of similarity calculated in step S20 is greater than or equal to a threshold (step S21). The threshold is a predetermined value of the degree of similarity, but the threshold may be determined as a value according to which it is possible to determine whether or not the orientation of communication terminal apparatus 10 is the same as or approximately the same as the orientation of communication terminal apparatus 10 during a call. If the result of the determination in step S21 is "NO", or in other words, if the degree of similarity is less than the threshold, control unit 11 performs call ending control for ending the call (step S22). As shown in the bottom portion of FIG. 8, a case is considered in which user U has performed an operation of placing the front surface of communication terminal apparatus 10 on his or her chest. As can be understood from comparison with the state shown in the top portion of FIG. 8, the presence of an object is detected by proximity sensor 17 in both states, but the degree of similarity is expected to be less than the threshold. Also, if user U performs this kind of operation, it is assumed that user U does not intend to continue the call. Accordingly, control unit 11 performs call ending control.

Note that between when the determination "NO" is made in step S21 and when the call ending control in step S22 is performed, control unit 11 may provide a delay of a predetermined period. For example, control unit 11 repeatedly measures the orientation in the predetermined period in step S21, and if the degree of similarity is never greater than or equal to the threshold or is not greater than or equal to the threshold continuously for a determined amount of time, control unit 11 performs the call ending control.

Figure 9:
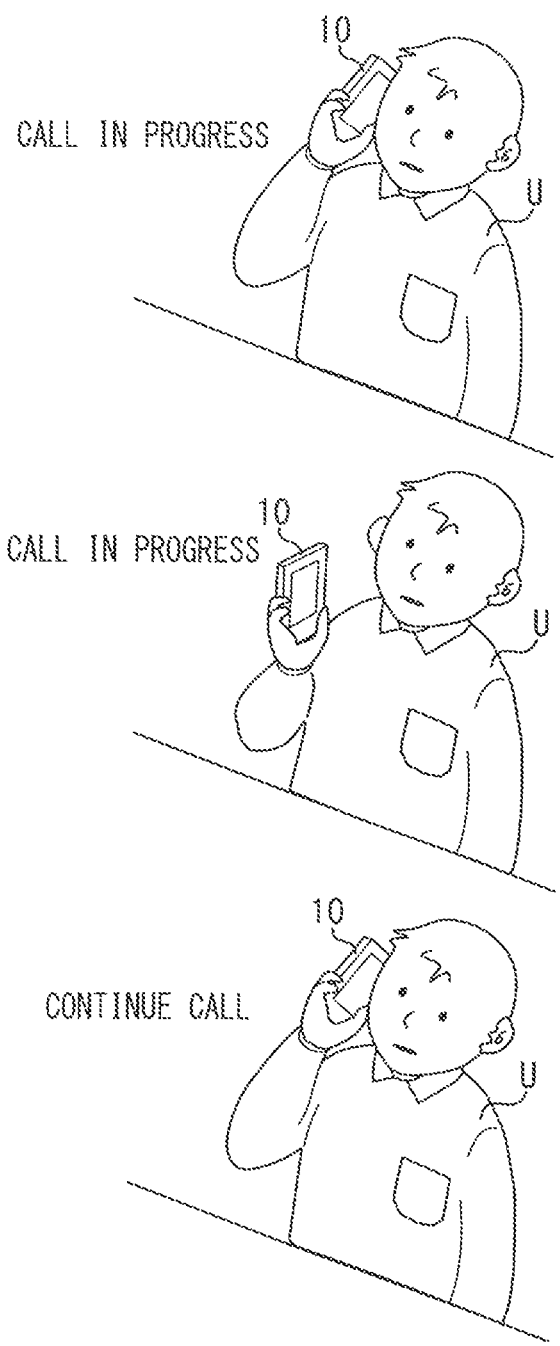
FIG. 9 is an explanatory diagram showing an example of a state of the communication terminal apparatus and a user.
Figure 10:
FIG. 10 is an explanatory diagram showing an example of a state of the communication terminal apparatus and a user.

If the result of the determination in step S21 is "YES", or in other words, if the degree of similarity is greater than or equal to the threshold, control unit 11 allows the call to continue and returns to the processing of step S11. As indicated by the sequence from the top portion to the bottom portion of FIG. 9, a case is considered in which, from a state in which communication terminal apparatus 10 is held against the right ear, user U performs an operation of temporarily removing communication terminal apparatus 10 from the right ear and once again bringing communication terminal apparatus 10 to the right ear. In this case, as can be understood by comparing the top portion and the bottom portion of FIG. 9, the presence of the object is detected by proximity sensor 17 in both cases and the degree of similarity is expected to be greater than or equal to the threshold. Also, if user U performs this kind of operation, it is assumed that user U intends to continue the call. Accordingly, control unit 11 allows the call to continue. As indicated by the sequence from the top portion to the bottom portion of FIG. 10, in the case where user U performs an operation of, from a state in which communication terminal apparatus 10 is held against the right ear, temporarily removing communication terminal apparatus 10 from the right ear, taking communication terminal apparatus 10 in the left hand, and holding communication terminal apparatus 10 up to the left ear, the degree of similarity is greater than or equal to the threshold according to calculation of the degree of similarity described in step S20. Accordingly, control unit 11 makes a determination of "YES" in step S21 and allows the call to continue.

If communication terminal apparatus 10 of the above-described second embodiment measures an operation of moving communication terminal apparatus 10 away from the head, which is naturally performed when the user ends a call, communication terminal apparatus 10 ends the call or allows the call to continue based on the difference between the orientation measured after that operation and the operation measured during detection of the presence of the head of the user (e.g., based on the degree of similarity). For example, even if the presence of the head of the user is detected after the presence of the head stopped being detected by proximity sensor 17, if the difference between the orientation of communication terminal apparatus 10 at a previous time of detecting the presence of the head and the orientation of communication terminal apparatus 10 at a later time of detecting the presence of the head is relatively large, communication terminal apparatus 10 performs call ending processing under the assumption that the user does not intend to continue the call. In contrast to this, in the case where the presence of the head of the user is detected after the presence of the head stopped being detected by proximity sensor 17, if the difference between the orientation of communication terminal apparatus 10 at a previous time of detecting the presence of the head and the orientation of communication terminal apparatus 10 at a later time of detecting the presence of the head is relatively small, communication terminal apparatus 10 allows the call to continue, under the assumption that the user intends to continue the call. Accordingly, with communication terminal apparatus 10, it is possible to perform call ending control at a timing intended by the user, in response to an action naturally performed by the user at a time of ending a call, without the user performing an operation of an operation element for ending the call.

Also, with communication terminal apparatus 10 of the present embodiment, the orientation of communication terminal apparatus 10, which is a condition for performing call ending control, changes according to the orientation during detection of the presence of the head while a call is in progress. Accordingly, even if the user is making a call while lying down, for example, communication terminal apparatus 10 can perform call ending control at a timing intended by the user.

Note that communication terminal apparatus 10 may execute both of the processes executed during a call, which were described in the first embodiment and the second embodiment above.

MODIFIED EXAMPLES

The present invention can be implemented using a mode that is different from the above-described embodiment. The present invention can also be implemented using the following modes, for example. Also, the modified examples indicated below may be combined as appropriate.

Modified Example 1

Communication terminal apparatus 10 of the above-described first embodiment may perform call ending control if a motion state that occurs due to an operation other than the operation of shaking communication terminal apparatus 10 performed by the user is measured. That is, an operation performed by the user using communication terminal apparatus 10 may be another operation in which the user applies an external force to communication terminal apparatus 10. For example, control unit 11 may perform call ending control if an operation of hitting communication terminal apparatus 10 (e.g., an operation of tapping the rear surface of communication terminal apparatus 10) or an operation of rotating communication terminal apparatus 10 is measured during detection of the presence of the user. Thus, communication terminal apparatus 10 may perform call ending control using various motion states, such as the orientation and displacement, as conditions.

Modified Example 2

Communication terminal apparatus 10 of the above-described second embodiment may allow the call to continue regardless of the value of the degree of similarity during a period in which the presence of the object is detected by proximity sensor 17. Also, communication terminal apparatus 10 may specify a difference between the orientation of communication terminal apparatus 10 when in a first state in which the presence of the object is detected by proximity sensor 17 and the orientation of communication terminal apparatus when in a second state in which the presence of the object is not being detected by proximity sensor 17 (e.g., communication terminal apparatus 10 may calculate the degree of similarity), and communication terminal apparatus 10 may perform call ending control when in the second state if the specified difference is relatively large (e.g., if the degree of similarity is less than a threshold), and may allow the call to continue when in the second state if the difference is relatively small (e.g., if the degree of similarity is greater than or equal to the threshold).

Modified Example 3

A portion of the configurations and operations described in the above-described embodiments may be omitted.

It is also possible to use a configuration in which communication terminal 10 ends the call or allows the call to continue without calculating the degree of similarity, instead of the configuration of the above-described second embodiment. In this case as well, communication terminal apparatus 10 performs call ending control if the difference between the orientation during a call and the orientation after the presence of an object stops being detected is greater than or equal to a certain degree, and communication terminal apparatus 10 allows the call to continue if the difference is less than the certain degree. Also, communication terminal apparatus 10 may end the call or allow the call to continue, with the orientation when in a state in which the user holds communication terminal apparatus 10 up to his or her right ear and the orientation when in a state of holding communication terminal apparatus 10 near the user's left ear being regarded as having a difference that is greater than or equal to the certain degree.

Also, communication terminal apparatus 10 may allow the sensors to continuously operate while the power source is turned on. Also, the above-described sensors provided in communication terminal apparatus 10 are merely examples. For example, communication terminal apparatus 10 may measure the orientation of communication terminal apparatus 10 using a gyrosensor (angular velocity sensor).

Modified Example 4

Communication terminal apparatus 10 is not limited to a smartphone and may be another portable communication terminal apparatus that performs communication for a call, such as a feature phone.

The communication terminal apparatus of the present invention can also be applied to a communication terminal apparatus that generates a bone-conducted sound indicating audio including incoming call audio in the body of a user, or in other words, a communication terminal apparatus including a speaker that outputs a bone-conducted sound. This communication terminal apparatus is configured such that a user can perform a call even when the communication terminal apparatus is in contact with a part of the head other than the ear of the user.

Also, the communication terminal apparatus of the present invention need not be a communication terminal apparatus that is used while being held by a user during a call. The communication terminal apparatus of the present invention may be a so-called wearable terminal that is used while attached to the head of the user, such as a headphone-type or earphone-type, for example.

Modified Example 5

The communication terminal apparatus of the present invention is not limited to a portable communication terminal apparatus, and may be a communication terminal apparatus including a handset, such as a fixed-type (stationary) communication terminal. This communication terminal apparatus includes, for example, a telephone main body that performs communication for a call, and a handset that is used by a user while held in the user's hand for a call. Examples of this kind of communication terminal apparatus include a telephone in which the telephone main body and the handset are connected via a cord (by a wire) and a cordless telephone in which the telephone main body and the handset are connected wirelessly.

The configurations and operations of the communication terminal apparatus of this modified example can be described by replacing the motion state of communication terminal apparatus 10 in the description of the embodiments above with the motion state of the handset, and replacing the presence of the object to communication terminal apparatus 10 in the description of the embodiments above with the presence of the object to the handset.

Modified Example 6

The functions realized by control units 11 of communication terminal apparatuses 10 of the above-described embodiments can be realized by a combination of multiple programs or through a combination of multiple hardware resources. If a function of control unit 11 is realized using a program, the program may be provided in a state of being stored in a computer-readable storage medium such as a magnetic storage medium (magnetic tape, magnetic disk (HDD (Hard Disk Drive), FD (Flexible Disk)), or the like), an optical storage medium (optical disk, or the like), a magneto-optical storage medium, or a semiconductor memory, or the program may be distributed via a network. Also, the present invention can be understood as a method for call ending control.

REFERENCE SIGNS LIST

10 Communication terminal apparatus
11 Control unit
111 Proximity detection unit
112 Motion state measurement unit
113, 113A Communication control unit
1131, 1131A Call ending control unit
1132 Similarity degree calculation unit
12 Touchscreen portion
121 Display unit
121A Display region
122 Touch sensor
13 Wireless communication unit
14 Microphone
15 Speaker
16 Acceleration sensor
17 Proximity sensor
18 Storage unit

The invention claimed is:

1. A portable communication terminal apparatus comprising:
a processor;
a proximity sensor configured to detect that an object exists in proximity to the communication terminal apparatus; and
a motion sensor configured to measure a motion state of the communication terminal apparatus, the motion state including at least one of an orientation of the communication terminal apparatus and a displacement of the communication terminal apparatus;
the processor configured to:
detect a first proximity in which a presence of the object is detected, a second proximity in which the presence of the object is not detected, and a third proximity in which, subsequent to the presence of the object no longer being detected, the presence of the object is once again detected during a call;
measure a first orientation of the communication terminal apparatus in the first proximity and a third orientation of the communication terminal apparatus in the third proximity; and
either end the call or allow the call to continue based on a difference between the first orientation and the third orientation;
wherein the processor is further configured to:
calculate a degree of similarity between the first orientation and the third orientation;
set a threshold so that the degree of similarity between the first orientation when the communication terminal apparatus is held against an ear of a user, and the third orientation when the communication terminal apparatus is held against another ear of the user, is greater than or equal to the threshold;
allow the call to continue when the calculated degree of similarity is greater than or equal to the threshold; and
end the call when the calculated degree of similarity is less than the threshold.

2. The communication terminal apparatus according to claim 1, wherein:
the processor measures a second orientation of the communication terminal apparatus in the second proximity; and
the processor ends the call or allows the call to continue based on a difference between the first orientation and the second orientation.

3. A communication terminal apparatus including a handset, comprising:
a processor;
a proximity sensor configured to detect that an object exists in proximity to the handset; and
a motion sensor configured to measure a motion state of the handset, the motion state including at least one of an orientation of the handset and a displacement of the handset;
the processor configured to:
detect a first proximity in which a presence of the object is detected, a second proximity in which the presence of the object is not detected, and a third proximity in which, subsequent to the presence of the object no longer being detected, the presence of the object is once again detected during a call;
measure a first orientation of the handset in the first proximity and a third orientation of the handset in the third proximity; and
either end the call or allow the call to continue based on a difference between the first orientation and the third orientation;
wherein the processor is further configured to:
calculate a degree of similarity between the first orientation and the third orientation;
set a threshold so that the degree of similarity between the first orientation when the handset is held against an ear of a user, and the third orientation when the handset is held against another ear of the user, is greater than or equal to the threshold;
allow the call to continue when the calculated degree of similarity is greater than or equal to the threshold; and
end the call when the calculated degree of similarity is less than the threshold.

* * * * *